United States Patent [19]

Yeo et al.

[11] Patent Number: 5,004,774

[45] Date of Patent: Apr. 2, 1991

[54] THERMOSETTING POLYIMIDE RESIN COMPOSITION

[75] Inventors: Jong K. Yeo; Chung S. Kim; Dong J. Lee; Sung H. Jang, all of Chungcheongnam, Rep. of Korea

[73] Assignee: Lucky, Ltd., Seoul, Rep. of Korea

[21] Appl. No.: 289,308

[22] Filed: Dec. 23, 1988

[30] Foreign Application Priority Data

Dec. 29, 1987 [KR] Rep. of Korea .................. 87-15197
Dec. 31, 1987 [KR] Rep. of Korea .................. 87-15568

[51] Int. Cl.$^5$ ........................... C08K 5/24; C08K 5/54
[52] U.S. Cl. .................................. 524/262; 524/263; 524/265; 524/267
[58] Field of Search ................ 524/263, 265, 262, 267

[56] References Cited

U.S. PATENT DOCUMENTS 3,562,223 2/1971 Paragain .

*Primary Examiner*—Paul R. Michl
*Assistant Examiner*—Christopher P. Rogers
*Attorney, Agent, or Firm*—Birch, Stewart, Kolasch & Birch

[57] ABSTRACT

A thermosetting polymide resin composition having an excellent molding processing property, heat resistance, low mold shrinkage, and good external appearance of its manufacture which comprises a modified bismaleimide resin prepared by reacting the Michael addition reaction of bismaleimides with aromatic primary diamines and aromatic secondary diamines, an inorganic filler, silicone oil, and a mixed catalyst composed of organic peroxides and imidazoles.

8 Claims, No Drawings

THERMOSETTING POLYIMIDE RESIN COMPOSITION

BACKGROUND OF THE INVENTION

The present invention relates to a novel thermosetting polyimide resin composition. More concretely, the present invention relates to the thermosetting unsaturated bismaleimide resin composition possessing excellent processability and heat resistance, lower mold shrinkage, and good external appearance of its molded product.

The thermosetting resin has been widely used in particularly the heat resistance-required fields such as the electronics industry, the auto industry, the machine-parts industry, and the like. And, there have been constant efforts for giving good mold ability to such thermosetting resin and reducing the mold shrinkage thereof.

In the case that the thermosetting resin is used as sealing materials for semiconductor devices, there are particularly required better heat resistance, improved impact strength, good damp resistance and low mold shrinkage. Recently, the demand for the unsaturated bismaleimide resins which have especially good heat resistance has rapidly increased.

The unsaturated resins produced by polymerization of only bismaleimides themselves, have generally distinguished heat resistance to the extent enough to show 430° C. or more of the thermal dissociation temperature because of their high crosslinking densities. On the other hand, they have some disadvantages in that they show inferior toughness because of their poor plasticities and they can be dissolved in only polar solvents having high boiling points such as N-methyl-2-pyrrolidone (NMP, b.p. 202° C.), N,N'-dimethyl formamide (DMF, b.p. 153° C.), and the like. Moreover, such resins require a long time for molding-processing because of their high curing temperatures, therefore, they have also an additional disadvantage in practical use.

U.S. Pat. No. 3,562,223, discloses a method that a modified bismaleimide resin is prepared by the Michael addition reaction of unsaturated bismaleimides and primary diamines. In the patent, the crosslinking density of the resin when cured, is reduced, and consequently the heat resistance of the resultant modified denatured bismaleimide resin deteriorates a little, but the resin has a toughness to some extent. And, there is used an organic peroxide as the curing accelerator in order to shorten the curing time.

Typical modified bismaleimide resin's compositions as plastic materials which are on the market, are the Kinel series manufactured by Rhone Poulenc Co. in France. They are thermosetting resin compositions composed of polyamine bismaleimide (PABM) prepolymer having a molecular weight of about 1,000, inorganic fillers and the other additives, wherein the prepolymer may be prepared by the Michael addition of N,N'-4,4'-diphenylmethane bismaleimide as a bismaleimide and 4,4'-diamino diphenyl methane as a primary diamine.

However, when said polyamine bismaleimide (PABM) is prepared in accordance with the method as disclosed above, there are some disadvantages, that is, its viscosity increases due to the progress of partial crosslinking, and thus the prepared polyamine bismaleimide becomes soluble only in a polar solvent having a high boiling point, such as N-methyl-2-pyrrolidone, etc. Also, because there is used an organic peroxide as the curing accelerator, gas is generated from thermal dissociation of the organic peroxide during molding process, and then the external appearance of the molded product cannot be preserved from damages.

SUMMARY OF THE INVENTION

An object of the present invention is to provide a novel thermosetting polyimide resin composition possessing excellent molding-processing property and heat resistance, lower mold shrinkage, and good external appearance of its molded product, which is characterized by comprising a modified bismaleimide resin, as a main component, prepared by the Michael addition of unsaturated bismaleimides with not only aromatic primary diamines but also aromatic secondary diamines.

DETAILED DESCRIPTION OF THE INVENTION

The present invention relates to a thermosetting resin composition comprising (1) 20 to 60 parts by weight of a modified bismaleimide resin prepared by the Michael addition reaction of bismaleimides with aromatic primary diamines and aromatic secondary diamines, wherein the molecular weight thereof ranges 600 to 1,600 and the softening temperature thereof ranges 40° to 110° C.;

(2) 40 to 80 parts by weight of an inorganic filler;

(3) 0.8 to 25 parts by weight of silicone oil; and (4) 0.5 to 5.0 parts by weight of a mixed catalyst of organic peroxides and imidazole compounds.

The modified bismaleimide resin of Component (1) is a characteristic component in the present invention, which is a unsaturated bismaleimide prepolymer prepared by the Michael addition reaction of bismaleimides with aromatic primary diamines and aromatic secondary diamines. Such modified bismaleimide resin has a molecular weight of 600 to 1,600, preferably 800 to 1,000, and a softening temperature of 40° to 110° C., preferably 60° to 80° C.

Said unsaturated bismaleimide which is used in preparation of the modified bismaleimide resin, may be shown by the following formula (I)

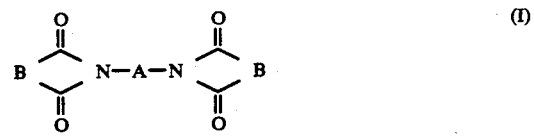

wherein,

B represents a divalent group having carbon atoms of at least 2, preferably 2 to 6, which contains a carbon-carbon double bond; and A represents a divalent group having carbon atoms of at least 2, generally 2 to 20.

In the present invention, the bismaleimides of the formula (I) include, for example, N,N'-1,3-phenylene bismaleimide, N,N'-4,4'-diphenyl methane bismaleimide, N,N'-4,4'-diphenylether bismaleimide, N,N'-4,4'-diphenyl sulfone bismaleimide, N,N'-3,4'-diphenylsulfone bismaleimide, N,N'-4,4'-dicyclohexyl methane bismaleimide, N,N'-4,4'-dimethylcyclohexane bismaleimide, N,N'-1,3-xylilene bismaleimide, 2,4-bismaleimide toluene, and so on.

The aromatic primary diamines which are used in the present invention, may be shown by the following formula (II)

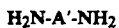 (II)

wherein, A' represents a divalent group having corbon atoms of less than 20, which includes at least one or more aromatic groups.

Such aromatic primary diamines of the formula (II) include, for example, N,N'-diamino diphenylmethane, 4,4'-diamino diphenylether, 4,4'-diamino diphenyl sulfone, m-phenylene diamine, p-phenylene diamine, 2,4-diamino toluene, 2,6-diamino toluene, and so on.

The aromatic secondary diamines which are used in the present invention, may be shown by the following formula (III)

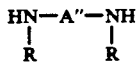 (III)

wherein,
A" represents a divalent group having carbon atoms of generally less than 20, which includes at least one or more aromatic groups; and
R represents an aliphatic group having carbon atoms of Such aromatic secondary diamines of the formula (III) include, for example, N,N'-dimethyl-4,4'-diaminodiphenylmethane, N,N'-methylethyl-4,4'-diaminodiphenylmethane, N,N'-dimethyl-4,4'-diaminodiphenylsulfone, N,N'-dimethyl-4,4'-diaminodiphenylether, N-(1,3-dimethylbutyl)-N'-phenyl-para phenylene diamine, N-isopropyl-N'-phenyl-para phenylene diamine, N,N'-diphenyl-para phenylene diamine, N,N'-dimethyl-2,4-diamino toluene, N,N'-diamino toluene, N,N'-dimethyl-2,6-diamino toluene, N,N'-dicyclohexyl-4,4'-diamino diphenylmethane, and so on.

According to the present invention, the bismaleimide (I) and the aromatic diamines (II) and (III) are preferably used in a ratio of 1.2:1 to 10:1 by mole more preferably 1.5:1 to 4:1 by mole. When the amount of aromatic diamines is less than said ratio, processability and toughness of the resin are reduced, even though heat resistance thereof can be improved. On the other hand, when the amount thereof is over said ratio, sufficient heat resistance cannot be obtained because the crosslinking density decreases undesirably.

And, the aromatic primary diamines and the aromatic secondary diamines may be used in a ratio of 1:9 to 9:1 by mole, preferably 1:4 to 4:1 by mole, respectively. When the amount of the aromatic secondary diamines to the aromatic primary diamines is over said ratio, processability and water absorptivity of the resin can be improved but mechanical strength decreases. When the amount thereof is less than said ratio, fluidity of the resin becomes to be reduced, which has a bad effect on molding.

The inorganic filler of Component (2) in the present invention includes, for example, silicon oxide, calcium carbonate, alumina, fused silica, crystalline silica, glass fiber, carbon fiber, graphite, magnesite, calcium sulfate, tar, mica, quartz sand, kaolin, aluminum hydroxide, asbestos molybdenum sulfide, and the like. These inorganic fillers may be used individually or in combination of more than two sorts thereof.

As fused silica and crystalline silica among said inorganic fillers particularly have good wetting property, they give more improved to the modified bismaleimide resin, therefore, the resin is suitable to be used for sealing materials. At this moment, their particle diameter is preferred to range from 5 to 30 μm.

In the present invention, the inorganic filler [Component (2)] is modified used in an amount of 40 to 80 parts by weight to the modified bismaleimide resin [Component (1)] of 20 to 60 parts by weight. When the amount of the inorganic filler is less than 40 parts by weight, the thermal expansion coefficient of the resin composition decreases, and then its properties such as heat resistance, anticrack property and damp resistance, are decreased when the resin composition is used for sealing. On the other hand, when the amount thereof is over 80 parts by weight, fluidity of the resin composition is reduced and it is difficult to be molded.

The silicone oil of Component (3) in the present invention is composed of the repeat unit —[—Si—O—]—, which keeps a liquid phase at normal temperature (25° C.). The silicone oil of the present invention includes dimethyl silicone oil, methylphenyl silicone oil, or a modified silicone oil, for example, polydiorgano siloxane oil, fluoro silicone oil, silicone-polyester copolymerization oil, alkyl-modified silicone oil, fatty acid-modified silicone oil, amino-modified silicone oil, imino-modified silicone oil, epoxy-modified silicone oil, and the like. It is preferred to have a viscosity of 500~1,000,000 CPS at normal temperature. Especially, amino-modified silicone oil having an amine functional group is more preferably used, because it has excellent heat-impact resistance.

The amount of the silicone oil [Component (3)] preferably used is 0.8 to 25 parts by weight, more preferably 1.5 to 5.0 parts by weight, to the modified bismaleimide resin [Component (1)] of 20 to 60 parts by weight. When the amount of the silicone oil is less than 0.8 parts by weight, thermal stress resistance and thermal impact resistance of the resin composition cannot be sufficiently improved. On the other hand, when the amount is over 24 parts by weight, processability thereof decreases to an undesirable level.

For lowering the curing temperature and shortening the curing time of the thermosetting resin composition according to the present invention, the mixed catalyst composed of organic peroxides and imidazole compounds, namely Component (4) of the present invention, is further added to said Components (1), (2), and (3), as the curing accelerator. In case that such mixed catalyst is used as the curing accelerator, there is an advantage that the external appearance of the shaped product is good. However, according to the prior art in which an organic peroxide like dicumyl peroxide (DCP) was used alone as the curing accelerator, the external appearance of the shaped product couldn't be preserved from damages, because gas was generated from thermal dissociation of the used organic peroxide during shaping.

Typical organic peroxides which are preferably used in the present invention include, for example, benzoyl peroxide (BPO), dicumyl peroxide (DCP), di (tertbutyl) peroxide (DTBP), α,α'-bis(tert-butylperoxypropyl) benzene, α,α'-bis-(tert-butylperoxyisopropyl) benzene, 4,4'-di-tert-butylperoxy-n-butyl valerate, 1,1'-di-tert-butylperoxy-3,3,5-trimethylcyclohexane, and the like.

Typical imidazole compounds include, for example, imidazole, 2-methylimidazole, 1,2-dimethylimidazole, 2-phenylimidazole, 2-ethylimidazole, 2-ethyl-4-methylimidazole, 2-methyl-4-phenylimidazole, 2-undecyl imidazole, and the like.

Especially, when the thermosetting resin composition is used as a sealing material for semiconductor devices, one or more compounds selected from the organic phosphines consisting of triphenyl phosphine, tributyl phosphine and so on, and the amines consisting of triethylamine, diethylene amine, triethylene tetraamine, N-aminoethyl piperazine, ethoxylene diamine and the like, are preferably used in company with organic peroxides and imidazole compounds as mentioned above.

The mixed catalyst [Component (4)] is preferably used in an amount of 0.5 to 5.0 parts by weight to the modified bismaleimide resin [Component (1)] of 20 to 60 parts by weight. When the amount of the mixed catalyst is less than 0.5 parts by weight, the curing of the resin composition becomes to occur slowly and the resin composition is not cured sufficiently. On the other hand, when the amount is over 5.0 parts by weight, surplus catalyst itself acts as an impurity and then various properties of the resin become to sharply decrease.

At this moment, the mixed catalyst is preferably composed in a ratio of 1:5 to 5:1 by weight of the organic peroxides and the imidazole compounds.

The thermosetting polyimide resin composition according to the present invention may comprise other additives in addition to previously stated components, for example, coloring agents such as carbon black; releasing agents such as stearic acid, zinc stearate, natural wax, higher fatty acids or their metallic salts, paraffin and the like; coupling agents such as epoxy silane, vinyl silane, amino silane, borane compounds, alkoxy titanate compounds, aluminium chelate compounds, and the like, in an amount of less than 5.0 parts by weight to the inorganic filler of 40 to 80 parts by weight, respectively, in order to further improve the properties of the resin composition.

Especially, the thermosetting polyimide resin composition which is composed of 20 to 50 parts by weight of the modified bismaleimide resin perpared by the Michael addition of bismaleimides with aromatic primary diamines and aromatic secondary diamines, 50 to 80 parts by weight of silica powder, and 0.8 to 25 parts by weight of silicone oil, is effectively used for sealing semiconductor devices. Wherein, the modified bismaleimide resin has a molecular weight of 600 to 1,600 and a softening temperature of 40° to 110° C. As said silica powder, fused silica or crystalline silica which have an average diameter of 5 to 30 μm are preferably used.

In the present invention, there are reacted not only aromatic primary diamines but also aromatic secondary diamines with bismaleimides at a low temperature when the modified bismaleimide resin is prepared in accordance with the Michael addition reaction. Therefore, the previous problems, that is, the resin viscosity's sudden increase due to progression of crosslinking during said addition reaction, can be solved, and the pot life of the resin composition, the maximum usable time of the resin composition which is not cured yet in spite of addition of the curing agent, can be improved to a considerable degree and resultingly the resin composition can be used without any solvent.

According to the present invention, molecular weights and viscosities of the objective prepolymer can be also controlled freely as changing the mixed mole ratio of aromatic primary diamines and aromatic secondary diamines, and then the resin composition can undergo various moldings such as compression, injection, transfer molding, and the like. Moreover, the resin composition can contain a large quantity of fillers because it has a good fluidity. Consequently, the present invention has some advantages in process and in economy.

And also, because imidazole compounds as well as organic peroxides are further added as the curing accelerator in the present invention, it is possible to prevent gas generation resulted from the thermal dissociation of organic peroxides and good external appearance of the shaped product can be obtained. This is because the added imidazole compounds have not only a good cure-accelerating effect but also a control action of the thermal dissociation of organic peroxides.

The resin composition of the present invention, moreover, has lower mold shrinkage and more improved heat-impact resistance due to use of silicone oil.

Hence, the thermosetting polyimide resin composition according to the present invention has excellent shaping-processing property, improved heat resistance, lower mold shrinkage, and good external appearance of its shaped product, and then it is preferred to be used in various fields of the electronics and machine-parts industry, and especially as sealing materials for semiconductor devices.

The present invention will be further described in detail with the following examples. It should not be noted that the present invention is not limited to these examples.

PREPARATION 1

Preparation of a modified bismaleimide resin 5.65 g (0.025 moles) of N,N'-dimethyl-4,4'-diaminodiphenylmethane and 14.85 (0.075 moles) of 4,4'-diaminodiphenylmethane were put into a three-neck flask equipped with a stirrer and a thermometer, and preheated to 140° C., and 107.4 g (0.30 moles) of N,N'-4,4'-diphenylmethane bismaleimide were added therein. The mixture was reacted for 10 minutes at 140° C. with stirring until it became clear. The solution was further reacted for 30 minutes to be degassed, and it was poured into an aluminum plate and cooled down to normal temperature. The resultant solid resin was pulverized in a pestle bowl to obtain lustrous yellowish brown resin powder. The obtained resin powder was named "modified bismaleimide resin A".

The softening temperature and the molecular weight of the resin were measured by using a thermal analyzer and GPC, and the results were shown in Table 1.

PREPARATIONS 2 AND 3

As the result of following the procedure of the Preparation 1 except that N,N'-dimethyl-4,4'-diaminodiphenylmethane and N,N'-diamino-diphenylmethane was used in an amount of 0.05 mole and 0.05 moles (Preparation 2), and 0.075 moles and 0.025 moles (Preparation 3), respectively, the yellowish brawn resin powders were obtained. The obtained resin powders were named "modified bismaleimide resin B" and "modified bismaleimide resin C", respectively.

Their softening temperatures and molecular weights were measured by using a thermal analyzer and GPC, and the results were shown in Table 1.

TABLE 1

| Resin | softening Temp. (°C.) | M.W. |
|---|---|---|
| modified bismaleimide resin A | 75 | 950 |
| modified bismaleimide resin B | 68 | 900 |
| modified bismaleimide resin C | 63 | 850 |

EXAMPLE 1

30 parts by weight of the denatured bismaleimide resin A and 61.5 parts by weight of 3 mm glass fiber, 5 parts by weight of amino-modified dimethyl slicone oil (Viscosity; 10,000 CPS at 23° C.), 1.0 part by weight of dicumyl peroxide (DCP), 0.5 parts by weight of 2-ethyl-4-methyl imidazole, 1.0 parts of by weight of amino silane coupling agent A-1100 (manufactured by Union Carbide Co.), 1.0 part of by weight of stearic acid, and 1.0 part of carbon black were homogeneously mixed by using a mixer. The mixture was melted with agitating for 10~15 minutes in Brabender which was preheated to 80°~110° C., and cooled to normal temperature. It was minutely pulverized by using a grinder to obtain the composition powder.

30 g of the composition powder were put into a cubic mold (125 mm×130 mm×135 mm) and the mold was inserted into a press which was preheated to 200° C. And after, it was pressed to 50 kg/cm² and keeped for an hour as it was. After removing the mold being still a high temperature, the cured composition was post-cured at 220° C. for 24 hours. Thus post-cured composition was used for measuring the material properties as followings;

Flexural Strength: ASTM D 790
Flexural Modulus: ASTM D 790
Thermal expansion coefficient: Thermomechanical Analysis (TMA)
Glass transition temperature: Thermomechanical Analysis (TMA)
Water absorptin: ASTM D 570-71
Mold shrinkage: ASTM D 955

The results were shown in Table 2.

EXAMPLE 2

A resin composition was prepared following the procedure of Example 1 but using 30 parts by weight of the modified bismaleimide resin B instead of the denatured bismaleimide resin A.

The material properties thereof were evaluated by the same method as in Example 1, and the results were shown in Table 2.

EXAMPLE 3

A resin composition was prepared following the procedure of Example 1 but using 26 parts by weight of the modified bismaleimide resin B instead of the modified bismaleimide resin A, and 44 parts by weight of glass fiber and 22.5 parts by weight of fused silica as inorganic fillers.

The material properties thereof were evaluated by the same method as in Example 1, and the results were shown in Table 2.

EXAMPLE 4

A resin composition was prepared following the procedure of Example 1 but using 30 parts by weight of the modified bismaleimide resin C instead of the modified bismaleimide resin A.

The material properties thereof were evaluated by the same method as in Example 1, and the results were shown in Table 2.

EXAMPLE 5

As the result of following the procedure of Example 1 but using 30 parts by weight of the modified bismaleimide resin C instead of the modified bismaleimide resin A, and 71.5 parts by weight of fused silica as an inorganic filler, resin composition powder was obtained. The resin composition powder was tableted, and the obtained tablets were preheated by using a high frequency preheater. The preheated tablets were put into a mold and molded using a low pressure transfer molding machine under a transfer pressure of 25 to 100 kg/cm². It was cured for 2 to 5 minutes at 200° C., and after, the cured composition was released from the mold and post-cured at 220° C. for 24 hours.

The material properties thereof were evaluated by the same method as in Example 1, and the results were shown in Table 2.

COMPARATIVE EXAMPLE 1

A comparative resin composition was prepared following the procedure of Example 1 but using 35 parts by weight of polyaminobismaleimide (PABM) prepolymer prepared by reacting N,N'-4,4'-diphenylmethane bismaleimide and 4,4'-diaminodiphenyl methane in a ratio of 3:1 by mole instead of 30 parts by weight of the modified bismaleimide resin A, without amino-modified dimethyl silicone oil.

The material properties thereof were evaluated by the same method as in Example 1, and the results were shown in Table 2.

COMPARATIVE EXAMPLE 2

A comparative resin composition was prepared following the procedure of Example 1 but using 1.5 parts by weight of dicumyl peroxide alone instead of the mixed catalyst composed of 1.0 part by weight of dicumyl peroxide and 0.5 parts by weight of imidazole as a curing accelerator.

The material properties thereof were evaluated by the same method as in Example 1, and the results were shown in Table 2.

TABLE 2

| Components & Material properties | Example No. 1 | 2 | 3 | 4 | 5 | Comparative example No. 1 | 2 |
|---|---|---|---|---|---|---|---|
| Modified bismaleimide resin A | 30 | — | — | — | — | — | 30 |
| Modified bismaleimide resin B | — | 30 | 25 | — | — | — | — |
| Modified bismaleimide resin C | — | — | — | 30 | 20 | — | — |
| PABM prepolymer | — | — | — | — | — | 35 | — |
| Glass fiber | 61.5 | 61.5 | 44 | 61.5 | — | 61.5 | 61.5 |
| Fused silica | — | — | 22.5 | — | 71.5 | — | — |
| Amino-modified dimethyl silicon oil | 5.0 | 5.0 | 5.0 | 5.0 | 5.0 | — | 5.0 |
| Dicumyl peroxide | 1.0 | 1.0 | 1.0 | 1.0 | 1.0 | 1.0 | 1.5 |

TABLE 2-continued

| Components & Material properties | | Example No. 1 | 2 | 3 | 4 | 5 | Comparative example No. 1 | 2 |
|---|---|---|---|---|---|---|---|---|
| 2-ethyl-4-methyl imidazole | | 0.5 | 0.5 | 0.5 | 0.5 | 0.5 | 0.5 | — |
| Amino silane coupling agent A1100 | | 1.0 | 1.0 | 1.0 | 1.0 | 1.0 | 1.0 | 1.0 |
| Stearic acid | | 1.0 | 1.0 | 1.0 | 1.0 | 1.0 | 1.0 | 1.0 |
| Carbon black | | 1.0 | 1.0 | 1.0 | 1.0 | 1.0 | 1.0 | 1.0 |
| Modl releasing property | | excellent | excellent | excellent | excellent | excellent | good | good |
| Curing property | | excellent | excellent | excellent | excellent | excellent | good | good |
| External Appearance | | excellent | excellent | excellent | excellent | excellent | good | bad |
| Flexural strength | at 25° C. (kg/cm$^2$) | 2300 | 2200 | 2050 | 2100 | 1900 | 2200 | 2300 |
| Flexural strength | at 250° C. (kg/cm$^2$) | 1900 | 1800 | 1700 | 1700 | 1500 | 1800 | 1900 |
| Flexural modulus | at 25° C. (kg/cm$^2$) | $1.9 \times 10^5$ | $1.8 \times 10^5$ | $1.8 \times 10^5$ | $1.7 \times 10^5$ | $1.6 \times 10^5$ | $1.9 \times 10^5$ | $1.9 \times 10^5$ |
| Flexural modulus | at 250° C. (kg/cm$^2$) | $1.5 \times 10^5$ | $1.4 \times 10^5$ | $1.4 \times 10^5$ | $1.3 \times 10^5$ | $1.2 \times 10^5$ | $1.45 \times 10^5$ | $1.5 \times 10^5$ |
| Thermal expansion coefficient | (1/°C.) | $1.8 \times 10^{-5}$ | $1.8 \times 10^{-5}$ | $1.7 \times 10^{-5}$ | $1.7 \times 10^{-5}$ | $1.6 \times 10^{-5}$ | $2.0 \times 10^{-5}$ | $1.8 \times 10^{-5}$ |
| Glass transition temperature | (°C.) | 300 | 298 | 295 | 290 | 285 | 300 | 300 |
| Water absorption | (%) | 0.45 | 0.4 | 0.4 | 0.3 | 0.3 | 0.6 | 0.45 |
| Mold shrinkage | (%) | 0.1 | 0.1 | 0.15 | 0.1 | 0.15 | 0.20 | 0.10 |

PREPARATION 4

11.3 g (0.05 moles) of N,N'-dimethyl-4,4'-diaminodiphenylmethane, 9.9 g (0.05 moles) of methylene dianiline and 89.5 g (0.25 moles) of N,N'-4,4'-diphenylmethane bismaleimide were added into a three-neck flask equipped with a stirrer and a thermometer. The mixture was reacted for 30 minutes at 130° C. with stirring until it became clear. The solution was poured on an aluminum plate and cooled down to normal temperature. The resultant solid resin was pulverized in a pestle bowl to obtain lustrous yellowish brown resin powder. The obtained resin powder was named "modified bismaleimide resin D".

The softening temperature and the molecular weight of the resin were measured by using a thermal analyzer and GPC, and the results were shown in Table 3.

PREPARATIONS 5 TO 7

As the result of following the procedure of Preparation 1 except that N,N'-dimethyl-4,4'-diaminodiphenylmethane and methlene dianiline were used in amounts of 0.025 moles and 0.075 moles (Preparation 5), 0.075 moles and 0.025 moles (Preparation 6), and 0 mole and 0.10 mole (Preparation 7), respectively, the yellowish brown resin powders were obtained. The obtained resin powders were named "modified bismaleimide resin E", "modified bismaleimide resin F" and "modified bismaleimide resin G", respectively.

The softening temperatures and the molecular weights were measured by the same method as in Preparation 1, and the results were shown in Table 3.

TABLE 3

| Resin | Property Softening Temp. (°C.) | M.W. |
|---|---|---|
| Modified bismaleimide resin D | 64 | 900 |
| Modified bismaleimide resin E | 66 | 950 |
| Modified bismaleimide resin F | 62 | 850 |
| Modified bismaleimide resin G | 80 | 1000 |

EXAMPLE 6

95 parts by weight of the modified bismaleimide resin D, 233.3 parts by weight of fused silica, 5 parts by weight of amino-modified dimethyl silicone oil (Viscosity; 10,000 CPS at 25° C., 1.0 part by weight of dicumyl peroxide, 0.5 parts by weight of imidazole, 1.5 parts by weight of amino silane coupling agent A-1100 (manufactured by Union Carbide Co.), 1.5 parts by weight of carnauba wax and 0.5 parts by carbon black were homogeneously mixed by using a mixer. The mixture was compounded at 80°~110° C., by using a roller equipped with two rolls, and then it was cooled, crushed and tableted to obtain the resin composition for sealing semiconductor devices.

The obtained resin composition was used for measuring the material properties as followings;
Spiral flow: EMMI-I-66 (Epoxy Molding Institute; Society of Plastic Industry)
Flexural Modulus: ASTM D-790
Thermal expansion coefficient: TMA
Glass transition temperature: TMA
Water absorptin: ASTM D 570
The results were shown in Table 4.

EXAMPLE 7

A resin composition for sealing semiconductor devices was prepared following the procedure of Example 6 but using 5 parts by weight of epoxy-modified dimethyl silicone oil as silicone oil.

The material properties thereof were evaluated by the same method as in Example 6, and the results were shown in Table 4.

EXAMPLE 8

A resin composition for sealing semiconductor device was prepared following the procedure of Example 6 but using 95 parts by weight of the modified bismaleimide resin E instead of the modified bismaleimide resin D.

The material properties thereof were evaluated by the same method as in Example 6, and the results were shown in Table 4.

EXAMPLE 9

A resin composition for sealing semiconductor device was prepared following the procedure of Example 6 but using 95 parts by weight of the modified bismaleimide resin F instead of the modified bismaleimide resin D.

The material properties thereof were evaluated by the same method as in Example 6, and the results were shown in Table 4.

COMPARATIVE EXAMPLE 3

A comparative resin composition was prepared following the procedure of Example 6 but using 95 parts by weight of the modified bismaleimide resin G instead of the modified bismaleimide resin D.

The material properties thereof were evaluated by the same method as Example 6, and the results were shown in Table 4.

COMPARATIVE EXAMPLE 4

Following the procedure of Example 6 but using 100 parts by weight of modified bismaleimide resin D as a bismaleimide resin without using amino-modified dimethyl silicone oil, the comparative resin composition was prepared.

The material properties were evaluate by the same method as Example 6, and the results were shown in Table 4.

TABLE 4

| Components & Material properties | | Example No. 6 | 7 | 8 | 9 | Comparative example No. 3 | 4 |
|---|---|---|---|---|---|---|---|
| Modified bismaleimide resin D | | 95 | 95 | — | — | — | 95 |
| Modified bismaleimide resin E | | — | — | 95 | — | — | — |
| Modified bismaleimide resin F | | — | — | — | 95 | — | — |
| Modified bismaleimide resin G | | — | — | — | — | 95 | — |
| Fused silica | | 233.3 | 233.3 | 233.3 | 233.3 | 233.3 | 233.3 |
| Amino-modified dimethyl silicone oil | | 5 | — | 5 | 5 | 5 | — |
| Epoxy-modified dimethyl silicone oil | | — | 5 | — | — | — | — |
| Dicumyl peroxide | | 1 | 1 | 1 | 1 | 1 | 1 |
| Imidazole | | 0.5 | 0.5 | 0.5 | 0.5 | 0.5 | 0.5 |
| Amino silane coupling agent A1100 | | 2 | 2 | 2 | 2 | 2 | 2 |
| Carnauba wax | | 1.5 | 1.5 | 1.5 | 1.5 | 1.5 | 1.5 |
| Carbon black | | 0.5 | 0.5 | 0.5 | 0.5 | 0.5 | 0.5 |
| Spiral flow | (inch) | 38 | 37 | 34 | 40 | 33 | 37 |
| Flexural Modulus | (kg/cm$^2$) | $1.28 \times 10^5$ | $1.29 \times 10^5$ | $1.30 \times 10^5$ | $1.29 \times 10^5$ | $1.35 \times 10^5$ | $1.50 \times 10^5$ |
| Thermal expansion coefficient | (1/°C.) | $1.38 \times 10^{-5}$ | $1.38 \times 10^{-5}$ | $1.4 \times 10^{-5}$ | $1.35 \times 10^{-5}$ | $1.5 \times 10^{-5}$ | $1.55 \times 10^{-5}$ |
| Glass transition temperature | (°C.) | 257 | 259 | 256 | 260 | 258 | 260 |
| Water absorption | (%) | 0.27 | 0.30 | 0.30 | 0.27 | 0.35 | 0.40 |

We claim:

1. A thermosetting polyimide resin composition, comprising
   (1) 20 to 60 parts by weight of a modified bismaleimide resin prepared by the Michael addition reaction of bismaleimides with aromatic primary diamines and aromatic secondary diamines;
   (2) 40 to 80 parts by weight of an inorganic filler;
   (3) 0.8 to 25 parts by weight of silicone oil; and
   (4) 0.5 to 5.0 parts by weight of a mixed catalyst composed of organic peroxides and imidazole compounds.

2. The resin composition according to claim 1, wherein the modified bismaleimide resin is prepared by the Michael addition reaction of bismaleimides with aromatic diamines in a ratio of 1.2:1 to 10:1 by mole.

3. The resin composition according to claim 1 wherein the modified bismaleimide resin has a molecular weight of 600 to 1,600 and a softening temperature of 40° to 110° C.

4. The resin composition according to claim 1 wherein the aromatic primary diamine and the aromatic secondary diamine are used in a ratio of 1:9 to 9:1 by mole.

5. The resin composition according to claim 1, wherein the inorganic filler is selected one or more from the group consisting of silicon oxide, calcium carbonate, alumina, fused silica, crystalline silica, glass fiber, carbon fiber, graphite, plaster, tar, mica, quartz sand, kaolin, aluminum hydroxide, asbestos, molybdenum sulfide, and the like.

6. The resin composition according to claim 1, wherein the silicone oil has an amine functional group or an epoxy functional group.

7. The resin composition according to claim 1, wherein the silicone oil has a viscosity of 500 to 1,000,000 CPS at normal temperature.

8. The resin composition according to claim 1, wherein the mixed catalyst is composed in a ratio of 1:5 to 5:1 by weight of organic peroxides to imidazole compounds.

* * * * *